(12) United States Patent
Zhang et al.

(10) Patent No.: US 10,452,203 B2
(45) Date of Patent: *Oct. 22, 2019

(54) COMBINED SURFACE USER INTERFACE

(71) Applicant: Microsoft Technology Licensing, LLC, Redmond, WA (US)

(72) Inventors: Chunhui Zhang, Beijing (CN); Ji Zhao, Beijing (CN); Min Wang, Beijing (CN); Rui Gao, Beijing (CN); Xiong-Fei (Bruce) Cai, Beijing (CN); Chunshui Zhao, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 353 days.

This patent is subject to a terminal disclaimer.

(21) Appl. No.: 14/825,711

(22) Filed: Aug. 13, 2015

(65) Prior Publication Data

US 2015/0346857 A1 Dec. 3, 2015

Related U.S. Application Data

(63) Continuation of application No. 12/699,706, filed on Feb. 3, 2010, now Pat. No. 9,110,495.

(51) Int. Cl.
*G06F 3/042* (2006.01)
*H04N 5/232* (2006.01)
*H04N 9/31* (2006.01)
*G06F 3/00* (2006.01)

(52) U.S. Cl.
CPC ............... *G06F 3/042* (2013.01); *G06F 3/00* (2013.01); *H04N 5/23229* (2013.01); *H04N 9/31* (2013.01); *G06F 2203/04104* (2013.01)

(58) Field of Classification Search
CPC .................................. G06F 3/042; H04N 9/31
See application file for complete search history.

(56) References Cited

U.S. PATENT DOCUMENTS

| | | | |
|---|---|---|---|
| 5,831,601 A | 11/1998 | Vogeley et al. | |
| 5,933,132 A | 8/1999 | Marshall et al. | |
| 6,733,138 B2 | 5/2004 | Raskar | |
| 7,002,589 B2 | 2/2006 | Deering | |
| 7,735,018 B2 | 6/2010 | Bakhash | |
| 7,755,026 B2* | 7/2010 | Pittel | G06F 3/0428 250/221 |
| 7,889,952 B2* | 2/2011 | Miyazawa | H04N 9/3185 353/30 |
| 2002/0024612 A1 | 2/2002 | Gyoten | |
| 2004/0140971 A1* | 7/2004 | Yamazaki | G06F 3/14 345/204 |

(Continued)

OTHER PUBLICATIONS

Cao, et al., "Multi-User Interaction Using Handheld Projectors", In the Proceedings of the 20th Annual ACM Symposium on User Interface Software and Technology, Session: Novel Interaction, 2007, pp. 43-52.

(Continued)

*Primary Examiner* — Daeho D Song
(74) *Attorney, Agent, or Firm* — Schwegman Lundberg & Woessner, P.A.

(57) ABSTRACT

Techniques for utilizing two or more mobile devices equipped with projectors to generate a combined seamless user interfaces by stitching projection areas generated by the projectors.

20 Claims, 6 Drawing Sheets

(56) References Cited

U.S. PATENT DOCUMENTS

| | | | |
|---|---|---|---|
| 2004/0165154 A1* | 8/2004 | Kobori | G03B 21/26 353/69 |
| 2004/0210788 A1* | 10/2004 | Williams | G06F 3/1438 713/400 |
| 2005/0002000 A1* | 1/2005 | Salvatori | H04N 5/44513 353/119 |
| 2005/0073508 A1 | 4/2005 | Pittel et al. | |
| 2005/0078281 A1* | 4/2005 | Hatakeyama | G02B 15/14 353/69 |
| 2005/0117126 A1* | 6/2005 | Miyazawa | H04N 9/3147 353/94 |
| 2005/0120096 A1* | 6/2005 | Rekimoto | G08C 17/02 709/220 |
| 2005/0179874 A1* | 8/2005 | Miyazawa | G03B 21/13 353/94 |
| 2006/0077188 A1 | 4/2006 | Byun | |
| 2006/0158516 A1* | 7/2006 | Suginobu | H04N 9/3147 348/189 |
| 2006/0170874 A1* | 8/2006 | Yumiki | G03B 21/14 353/42 |
| 2006/0181685 A1* | 8/2006 | Hasegawa | G03B 37/04 353/69 |
| 2006/0227992 A1* | 10/2006 | Rathus | G06F 21/60 382/100 |
| 2006/0285077 A1* | 12/2006 | Miyasaka | G03B 21/26 353/30 |
| 2007/0058140 A1* | 3/2007 | Kobayashi | G03B 21/26 353/94 |
| 2007/0070066 A1 | 3/2007 | Bakhash | |
| 2007/0124503 A1 | 5/2007 | Ramos et al. | |
| 2007/0160373 A1* | 7/2007 | Biegelsen | H05B 37/0245 398/118 |
| 2007/0257927 A1* | 11/2007 | Sakanishi | G09G 5/005 345/581 |
| 2007/0264976 A1* | 11/2007 | Lessing | H04W 88/06 455/414.1 |
| 2008/0018591 A1* | 1/2008 | Pittel | G06F 1/1616 345/156 |
| 2008/0036691 A1* | 2/2008 | Yamada | G06F 3/1446 345/1.1 |
| 2008/0036971 A1* | 2/2008 | Hasegawa | G03B 21/26 353/30 |
| 2008/0043205 A1* | 2/2008 | Lonn | H04N 9/3173 353/69 |
| 2008/0049192 A1* | 2/2008 | Nozaki | G03B 17/00 353/25 |
| 2008/0055246 A1* | 3/2008 | Okayama | H04N 9/3129 345/158 |
| 2008/0074560 A1* | 3/2008 | Ichieda | H04N 9/3147 348/739 |
| 2008/0143969 A1 | 6/2008 | Aufranc et al. | |
| 2008/0212041 A1* | 9/2008 | Koizumi | G03B 29/00 353/122 |
| 2008/0239243 A1* | 10/2008 | Hasegawa | G03B 21/56 353/30 |
| 2008/0259223 A1* | 10/2008 | Read | H04N 9/3147 348/745 |
| 2008/0309884 A1* | 12/2008 | O'Dor | H04N 9/3147 353/7 |
| 2009/0015515 A1* | 1/2009 | Ichieda | H04N 5/74 345/33 |
| 2009/0140986 A1* | 6/2009 | Karkkainen | G06F 3/0486 345/173 |
| 2009/0141255 A1* | 6/2009 | Yoshizawa | G03B 21/005 353/122 |
| 2009/0244015 A1* | 10/2009 | Sengupta | H04W 4/21 345/173 |
| 2009/0284555 A1 | 11/2009 | Webb et al. | |
| 2010/0017745 A1* | 1/2010 | Kikuchi | G06F 3/1454 715/781 |
| 2010/0093399 A1* | 4/2010 | Kim | H04M 1/0202 455/566 |
| 2010/0123545 A1* | 5/2010 | Ozawa | G06F 21/84 340/5.8 |
| 2010/0149096 A1* | 6/2010 | Migos | G06F 3/0425 345/158 |
| 2010/0153878 A1* | 6/2010 | Lindgren | G06F 3/0481 715/810 |
| 2010/0168884 A1* | 7/2010 | Sakaguchi | G06Q 30/02 700/94 |
| 2010/0201702 A1 | 8/2010 | Franik et al. | |
| 2010/0299627 A1 | 11/2010 | Kenagy | |
| 2011/0001701 A1* | 1/2011 | Nakano | G02B 27/026 345/157 |
| 2011/0050595 A1 | 3/2011 | Lundback et al. | |
| 2011/0055729 A1 | 3/2011 | Mason et al. | |
| 2011/0119638 A1 | 5/2011 | Forutanpour | |
| 2011/0191690 A1* | 8/2011 | Zhang | G06F 3/00 715/746 |
| 2011/0248963 A1 | 10/2011 | Lawrence et al. | |

OTHER PUBLICATIONS

Fernandes, L. A. and Oliveira, M. M. 2008. "Real-time line detection through an improved Hough transform voting scheme", Pattern Recogn. 41, 1 (Jan. 2008), 299-314.

Haliburton, et al., "Pico Projectors, ProCams, and a New Kind of Interaction", TAT Discussion Paper, Retrieved on May 27, 2010 at <<http://www.tat.se/site/media/downloads/TAT_procams%20paper%20251108.pdf>> 4 pgs.

Hartley, Richard and Zisserman, Andrew, "Mutliple View Geometry in Computer Vision", 2nd Edition, Cambridge University Press, 2003.

"Least Squares Fitting", Wolfram Mathworld, http://mathworld.wolfram.com/LeastSquaresFitting.html, retrieved on Dec. 10, 2009.

Miyahara, et al., "Intuitive Manipulation Techniques for Projected Displays of Mobile Devices", ACM, Conference on Human Factors in Computing Systems, Session: Late Breaking Results: Short Papers, 2005, pp. 1657-1660.

Office action for U.S. Appl. No. 12/699,706, dated Nov. 9, 2012, Zhang et al., "Combined Surface User Interface", 20 pages.

Office action for U.S. Appl. No. 12/699,706, dated Dec. 26, 2014, Zhang et al., "Combined Surface User Interface", 15 pages.

Office action for U.S. Appl. No. 12/699,706, dated Jun. 28, 2012, Zhang et al., "Combined Surface User Interface", 12 pages.

Office action for U.S. Appl. No. 12/699,706, dated Jul. 21, 2014, Zhang et al., "Combined Surface User Interface", 10 pages.

D. Oberkampf, D. DeMenthon and L.S. Davis, "Iterative Pose Estimation using Coplanar Feature Points", CVIU (was called CVGIP: Image Understanding at the time), vol. 63, No. 3, May 1996.

Raskar, et al., "Intelligent Clusters and Collaborative Projector-Based Displays", NSF Workshop on Collaborative Virtual Reality and Visualization, Oct. 2003, 7 pgs.

Raskar, et al., "Multi-Projector Imagery on Curved Surfaces", Mitsubishi Electric Research Labs, Nov. 1998, Available at <<http://web.media.mit.edu/~raskar/CurvedScreen/curvedScreen.pdf>> 8 pgs.

Raskar, et al., "Seamless Projection Overlaps Using Image Warping and Intensity Blending", In the Fourth International Conference on Virtual Systems and Multimedia, Nov. 1998, Available at <<http://cs.unc.edu/Research/stc/publications/Raskar_VSMM98.pdf>> pp. 1-5.

Z. Zhang, "A flexible new technique for camera calibration", IEEE Transactions on Pattern Analysis and Machine Intelligence, vol. 22, No. 11, pp. 1330-1334, 2000.

* cited by examiner

COMBINED SURFACE USER INTERFACE

RELATED APPLICATIONS

This application claims priority to and is a continuation of U.S. patent application Ser. No. 12/699,706, filed on Feb. 3, 2010, the entire contents of which are incorporated herein by reference.

BACKGROUND

Hand-held mobile devices such as mobile phones have become small and powerful, and they continue to develop at a rapid pace. Pocket-sized, hand-held mobile devices now have the computing power to do many things that previously required large personal computers. However, small screen sizes and input methods of hand-held mobile devices are still challenging to users, and detract from the user experience. Users desire larger display screens to display more information and to interact more easily with both the user's device itself and with other devices that may be nearby.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The term "techniques," for instance, may refer to device(s), system(s), method(s) and/or computer-readable instructions as permitted by the context above and throughout the document.

The Detailed Description describes a mobile device that uses a projector to illuminate a projection area external to the mobile device, and uses the projection area as a user interface. The user interface can function as a touch screen or multi-touch screen and a user's interaction with the projection area can be captured by a camera of the mobile device. The mobile device can interconnect and collaborate with one or more neighboring mobile devices to stitch their projection areas and to thereby create a combined seamless user interface that utilizes the combined projection areas of the mobile device and its neighboring devices. Users of the multiple mobile devices can interact with each other on the combined seamless user interface.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

This disclosure describes techniques for using a projector of a mobile device to project or illuminate a projection area external to the mobile device and to use the projection area as a display and user interface. The mobile device can use one or more sensing mechanisms, such as an infrared illuminator and camera, to detect a user's interaction with the projection area. For example, the infrared camera might be used to detect movement of a stylus or finger relative to the projection area, such as when a user touches or nearly touches the surface of the projection area. This allows the user interface to act as a "touch" or touch-type screen, where the user touches or nearly touches areas of the projection area to interact with the mobile device. Both single-touch and multi-touch inputs can be detected.

In addition, two or more mobile devices can cooperate to create a combined or integrated user interface by stitching projection areas of the two or more mobile into an integrated and seamless display. The combined user interface has a larger combined display area compared to the LCDs or other native displays of the individual mobile devices. Different users can use the combined seamless user interface to perform interactive operations such as exchanging data and working collaboratively on a common project, document, or other resource.

This brief introduction is provided for the reader's convenience and is not intended to limit the scope of the claims.

General Environment

Figure 1:
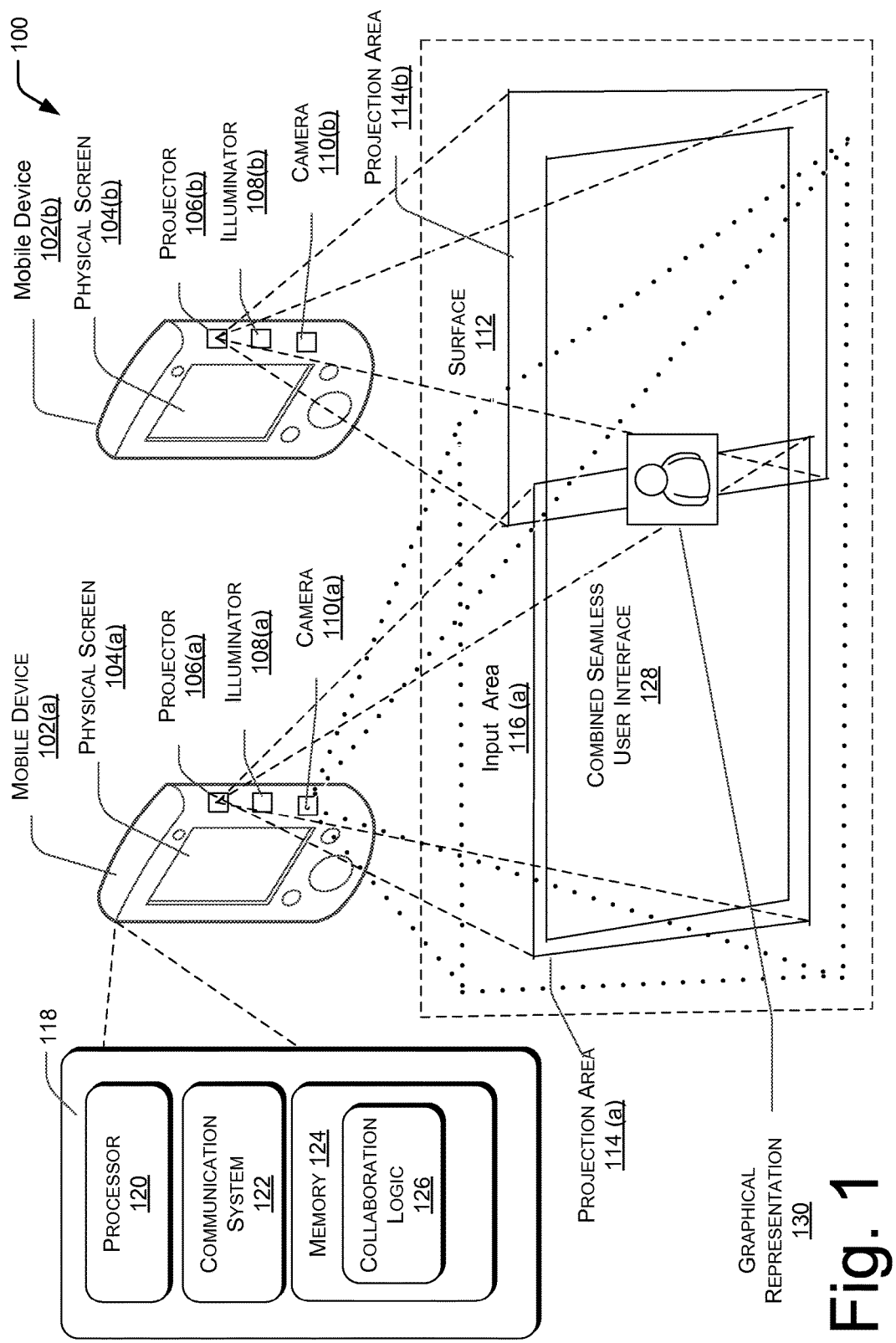
FIG. 1 is a block diagram showing an example of how multiple mobile devices can be used together to form a combined seamless user interface.

FIG. 1 shows an example of how multiple mobile devices can be used together to form a combined user interface. This example includes two computing devices, designated by reference numerals 102(a) and 102(b) and referred to as first mobile device 102(a) and second or neighboring device 102(b). Although the example of FIG. 1 shows only two devices, the techniques described herein can also be used with more than two devices, to create a combined user interface using projection components of all such devices. One or more of the devices may also be non-mobile.

For purposes of this discussion, first mobile device 102(a) will be described in some detail. Second device 102(b) and any other neighboring devices are understood to have similar components and functionality, although they may differ significantly in some respects.

Generally, first mobile device 102(a) can be a mobile phone, a PDA, a mobile internet device, a netbook, a personal media player, a laptop, a hand-held mobile device, or any other portable, mobile, computing or communications device.

Mobile device 102(a) can be equipped with a physical screen 104(a), a projector 106(a), an illuminator 108(a), and one or more image or touch sensors such as a camera 110(a).

The physical screen 104(a) displays graphics to a user and can be used as part of a default or primary graphical user interface. Screen 104(a) can be touch-sensitive to accept input from a user. Alternatively or additionally, keys or buttons (not shown) can be utilized for user input and interaction. The size of the physical screen 104(a) will often be quite small, limited by the small size of the mobile device 102(a).

Projector 106(a) can take many forms, including that of a so-called "pico" projector, which is small in size and has modest power requirements. The projector 106(a) displays a user interface on a surface 112 external to mobile device 102(a). The projected user interface occupies or defines a projection area 114(a) on surface 112. The projected image in this embodiment can display a secondary graphical user interface occupying at least a portion of projection area 114(a). The user can physically interact with this secondary graphical user interface to control or interact with the mobile device 102(a). In the example of FIG. 1, the secondary graphical user interface fully occupies projection area 114 (a). In many scenarios, the secondary user interface provided by projector 106(a) will be much larger than the primary user interface formed by physical screen 104(a).

Mobile device 102(a) can coordinate its physical screen 104(a) and its external projection area 114(a) in different ways. In one example, physical screen 104(a) and projection area 114(a) can show the same content. In another example, physical screen 104(a) only shows simple content, such as a reminder or a clock. When the user wants a large display to perform more complex or detailed operations, such as reading a document, surfing the Internet, or composing an email, the user can display a relevant application on projection area 114(a) and interact with the application by pointing at or touching surface 112 within projection area 114(a).

Illuminator 108(a) and camera 110(a) are used in combination to sense user interaction with the projected user interface, together forming what will be referred to herein as an input sensor. For example, illuminator 108(a) can be an infrared emitter that illuminates projection area 114(a) with non-visible infrared light. More generally, illuminator 108 (a) illuminates an input area 116(a) that is at least as large as projection area 114(a) and that encompasses projection area 114(a).

Camera 110(a) can be an infrared camera, sensitive to non-visible infrared light incident on input area 116(a). Camera 110(a) monitors the infrared illumination of the projection area to detect touch or touch-like interaction by a user with the displayed user interface. Furthermore, as will be described in more detail below, camera 110(a) detects portions of projection area 114(a) that overlap with projection areas of one or more neighboring computing devices.

There can be many different embodiments of mobile device 102(a). In one embodiment, projector 106(a), illuminator 108(a), and camera 110(a) are built into the mobile device 102(a), as shown in the FIG. 1. One or more of projector 106(a), illuminator 108(a), and camera 110(a) can also be modularly integrated with each other. For example, illuminator 108(a) and the camera 110(a) can be integrated as a single unit or module within mobile device 102(a) or connected to mobile device 102(a).

Input area 116(a) and projection area 114(a) may or may not be exactly the same as each other. In the example of FIG. 1, input area 116(a) is larger than and includes projection area 114(a) in order to detect user interaction across the entire projection area 114(a). In the embodiment described here, projector 106(a), illuminator 108(a), and camera 110 (a) are preconfigured and mounted relative to each other so that when mobile device 102(a) is placed upright on surface 112, input area 116(a) and projection area 114(a) are properly focused and sized on surface 112, and properly aligned with each other as shown.

In the example of FIG. 1, the secondary user interface displayed by the projector 106(a) acts as a touch-sensitive display; the input sensor consisting of illuminator 108(a) and camera 110(a) is able to detect when and where a user touches surface 112 within input area 116(a). In the illustrated example, the camera 110(a) senses the infrared illumination from illuminator 108(a). User interactions relative to surface 112 cause shadows in the IR illumination, which mobile device 102(a) interprets to determine placement of fingers or styli. In other embodiments, camera 110(a) may be sensitive to visible or projected light to optically capture the user's interactions within the input area 116(a).

Block 118 shows internal or logical components of first mobile device 102(a). Second mobile device 102(b) has similar components and functionality. The components of mobile devices 102(a) and 102(b) include one or more processors 120, a communication system 122, and memory 124.

Generally, memory 124 contains computer-readable instructions that are accessible and executable by processor 112. Memory 124 may comprise a variety of computer readable storage media. Such media can be any available media including both volatile and non-volatile storage media, removable and non-removable media, local media, remote media, optical memory, magnetic memory, electronic memory, etc.

Any number of program modules can be stored in the memory, including by way of example, an operating system, one or more applications, other program modules, and program data. Each of such program modules and program data (or some combination thereof) may implement all or part of the resident components that support the data center system as described herein.

Communication system 122 is configured to allow the first mobile computing device 102(a) to communicate with one or more neighboring computing devices. The communication system 122 can use wired or wireless techniques for communication. The neighboring computing devices can be other mobile devices or any other computing devices, such as digital cameras or cell phones. In order to produce a combined user interface, neighboring devices are logically coupled with each other or otherwise connected with each other for communication, collaboration, and display coordination. Devices can be coupled either automatically, in response to physical proximity; or manually, in response to explicit user commands.

Different techniques can be used by the mobile device 102(a) to automatically couple physically adjacent devices. For example, mobile device 102(a) can use wireless or bluetooth searching, ultrasonic techniques or other techniques to sense physical nearness of another device. Alternatively, mobile device 102(a) can use its camera 110(a) to detect an existence of a projection area of a neighboring device that overlaps projection area 114(a).

In one example, the user can manually build a connection or coupling between two devices such as mobile device 102(a) and neighboring device 102(b). The user can input information into mobile device 102(a) that identifies a neighboring device to be connected. To obtain this information from the user, the projector 106 (a) might project a user input field (not shown in the FIG. 1) on the projection area 114(a) along with a projected keyboard and a prompt instructing the user to enter information about neighboring device 102(b). Such information, to be provided by the user, might include a device name, user name/password, and/or a relative position of the neighboring device 102(b) to the mobile device 102(a). The user enters this information using the touch-sensitive or touch-like features implemented by mobile device 102(a) in conjunction with its projector 106(a), and mobile device 102(a) attempts to find neighboring device 102(b) according to the information entered by the user.

In another example, the connection among multiple mobile devices can be built automatically, without user action. For instance, mobile device 102(a) can detect or find neighboring device 102(b) by wireless searching. The wireless searching can use wi-fi, infrared, bluetooth, or other wireless techniques.

As yet another example, camera 110(a) can be monitored to detect a projection area of another device, such as a projection area 114(b) of neighboring device 102(b). Having sensed the existence of a neighboring device 102(b) in this manner, mobile device 102(a) can then attempt to connect or couple with it.

A mobile device may request identity information of neighboring device or vice versa for security purposes before the two mobile devices are interconnected or coupled for collaboration. A potential coupling can be allowed or denied based on the identity information. In one embodiment, mobile device 102(a) is configured with a "white list" of other devices with which coupling is allowed. This list may be configured by the user of mobile device 102(a). In another embodiment, one or more such white lists can be maintained by a third party to which mobile device 102(a) has access. Alternatively, the user of mobile device 102(a) might be asked for confirmation prior to implementing any potential coupling.

Mobile device 102(a) also has a collaboration logic 126, which in this example comprises computer-executable programs, routines, or instructions that are stored within memory 124 and are executed by processor 120. The collaboration logic 126 communicates with physically neighboring mobile devices using communication system 122, and coordinates with those devices to graphically stitch the projection area 114(a) of mobile computing device 102(a) with projection areas of one or more neighboring computing devices. For example, as shown in FIG. 1, collaboration logic 126 stitches projection area 114(a) with projection area 114(b) of neighboring mobile device 102(b). Furthermore, collaboration logic 126 creates a combined seamless user interface 128 utilizing a portion of projection area 114(a) of mobile computing device 102(a) and a portion of projection area 114(b) of neighboring device 102(b). The combined user interface 128 can be any shape or size within a boundary of both projection area 114(a) and projection area 114(b). The projection areas 114(a) and 114(b) are potentially clipped at their intersection so that the resulting clipped projection areas do not overlap each other, but are immediately adjacent each other. This avoids an abnormally bright area in the combined user interface that would otherwise result from the overlapped illumination of the two projectors.

As shown in FIG. 1, combined user interface 128 can be larger than the user interface that any single device might be able to display. In some usage scenarios, the collaboration logic 126 might coordinate with other devices to create a single user interface that is primarily for interaction with the single mobile device 102(a), with other devices acting in a slave mode to expand the user interface of mobile device 102(b). In other usage scenarios, the combined user interface may allow concurrent interaction with all of the different devices, and interactions with the combined user interface may cause actions or results in one or more of the multiple devices.

The combined seamless user interface 128 allows one or more graphical representations 130 to span and move seamlessly between the projections areas of the mobile computing device and the neighboring computing devices. As an example, FIG. 1 shows a graphical representation 130 (in this case an icon) that spans projection area 114(a) and projection area 114(b). In some embodiments, graphical representation 130 can be seamlessly dragged between projection area 114(a) and projection area 114(b).

Graphical representation 130 can correspond to device resources such as files, shortcuts, programs, documents, etc., similar to "icons" used in many graphical operating systems to represent various resources. Graphical representation 130 might alternatively comprise a displayed resource, menu, window, pane, document, picture, or similar visual representation that concurrently spans the projection areas of mobile device 102(a) and neighboring device 102(b).

After mobile device 102(a) is interconnected or logically coupled with neighboring device 102(b), collaboration logic 126 of mobile device 102(a) can collaborate with mobile device 102(b) to create the combined seamless user interface 128. In the example of FIG. 1 where the projection areas 114(a) and 114(b) are overlapping, collaboration logic 126 of mobile device 102(a) communicates with mobile device 102(b) to negotiate how each device will clip portions of its projection area 114 to avoid overlap. In addition, collaboration logic 126 communicates coordinates allowing the remaining projection areas of the two devices to be graphically stitched to each other to create the appearance of a single projected image or user interface utilizing at least portions of the projection areas 114(a) and 114(b).

Figure 2:
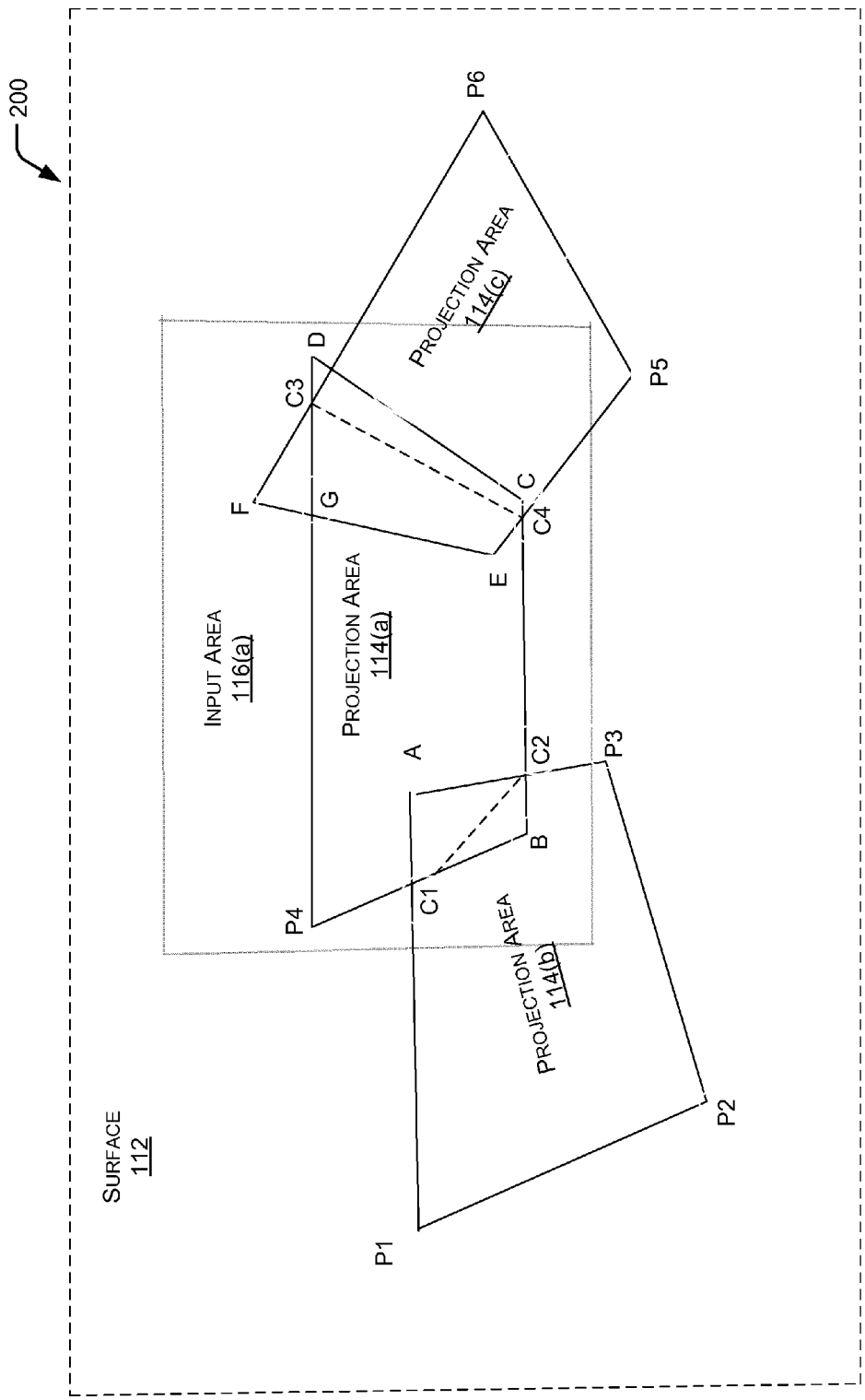
FIG. 2 is a block diagram showing an exemplary creation of a combined seamless user interface by combining multiple projection areas of multiple mobile devices.

FIG. 2 shows an example of how the projection areas of three devices might be clipped and stitched to form a combined interface. FIG. 2 shows three overlapping projection areas: projection area 114(a) produced by mobile device 102(a) of FIG. 1, projection area 114(b) produced by neighboring device 102(b), and another projection area 114(c) that might be produced by another neighboring device having capabilities similar to those of mobile device 102(a). Although FIG. 2 only shows three overlapping projection areas, the techniques described herein can be used for creation of a combined seamless user interface by combining any number of overlapping projection areas.

In addition to the projection areas 114(a), 114(b), and 114(c), FIG. 2 shows input area 116(a). Although other input areas are not shown in FIG. 2, it should be understood that each projection device might define its own input area, corresponding to its projection area.

The projection area 114(a) is represented by a polygon defined by (P4, B, C, D). The projection area 114(b) is represented by a polygon defined by (P1, P2, P3, A). The projection area 114(c) is represented by a polygon defined by (E, F, P5, P6). All of the projection areas and input areas locate at a surface 112.

As shown in FIG. 2, there is an overlapping portion between projection area 114(a) and projection area 114(b), forming a polygon defined by (C1, B, C2, A). Cross points between the two projection areas are C1 and C2. There is also an overlapping portion between projection area 114(a) and projection area 114(c), and cross points between the two projection areas are C3 and C4.

Because these overlapping portions and cross points are within input area 116(a), camera 110(a) of mobile device 102(a) can detect the overlapping portions and cross points. Specifically, mobile device 102(a) is configured to monitor its input area 116(a) with camera 110(a) and to detect any portions of projection area 114(a) that are significantly brighter than other parts of the projection area 114(a), after correcting for the localized brightness of the image being projected by mobile device 102(a) itself in projection area 114(a).

Collaboration logic 126 of mobile device 102(a) can communicate with the neighboring devices, including neighboring device 102(b), to define a new projection area of each device in the combined seamless user interface. Any one of the devices can detect an overlapping portion of its projection area with a projection area of another mobile device and calculate the cross points. In addition, any one of the devices can transmit this information to a neighboring device, or receive this information from a neighboring device. Once the cross points of the projection areas are determined, each mobile device can graphically stitch its projection area with the projection areas of the neighboring mobile devices to create a combined user interface.

The mobile devices communicate with each other to coordinate clipping at least part of the detected overlapping portions from the projection areas and stitching of remaining projection areas. In this example, mobile device 102(b) clips an overlapping portion defined by (C1, A, C2) from its projection area to leave a remaining projection area of the mobile device 102(b) which is a defined by (P1, P2, P3, C2, C1). By the same techniques, an overlapping portion defined by polygon (E, F, C3, C4) is clipped from projection area 114(c) to leave a remaining projection defined by (C3, C4, P5, P6). Mobile device 102(a) clips an overlapping portion defined by (C1, B, C2) and another overlapping portion defined by (C3, C4, C, D) from its projection area 114(a) to leave a remaining projection area (P4, C1, C2, C4, C3). As shown in the FIG. 2, some portions of the projection areas, such as an area defined by (F, G, C3) are also clipped from the projection area 206(c) even if they're not overlapping with another projection area, to preserve a uniform remaining projection area. Otherwise, content displayed at the projection area 206(c) is intersected by the remaining projection area of the mobile device 206(b) into multiple portions, a polygon defined by (C3, C4, P5, P6) and a polygon defined by (F, G, C3).

The mobile devices communicates with each other regarding the clipped portions and the remaining projection areas, as well as any calculated cross points. Each mobile device (e.g., mobile device 202(b)) only projects graphic representations in the remaining projection area to thereby avoid overlapping.

A single display combining the three projection areas 114(a), 114(b), and 114(c) is thus created, defined by (P1, P2, P3, C2, C4, P5, P6, C3, P4, C1).

The devices then communicate in real time to create a combined seamless user interface combining projection areas 114(a), 114(b), and 114(c). The combined user interface occupies at least a portion of the single display. In the example of FIG. 2, the combined seamless user interface fully occupies the single display.

The shape of the remaining projection areas and the combined seamless user interface in FIG. 2 which is the single display represented by a polygon defined by (P1, P2, P3, C2, C4, P5, P6, C3, P4, C1) are irregular, and possibly distorted because of the angle of surface 112 relative to the projectors of the various devices. Algorithms within the collaboration logic 126 of each device calculate the shape of each of the clipped or remaining projection areas and map the rectangular coordinates of each projection system to the distorted and possibly non-rectangular coordinates of the combined user interface.

The collaboration logic of a mobile device (e.g., collaboration logic 126) can also be configured to do automatic recalibration. In one example, if the user moves mobile device 102(b) away from mobile device 102(a), mobile device 102(a) can discover this by its input sensor and the collaboration procedures starts again to generate a new display combining a new projection area of mobile device 102(b) with the other projection areas. In another example, each mobile device routinely checks the integrity of the combined seamless user interface. When one projection area is lost, the interconnection procedure will start again and a new connection will be generated. To improve the performance, it is not necessary to rebuild all the connections if there are more than three devices and only several mobile devices near the lost projection area are involved.

Although the projection areas are overlapping in FIG. 1 and FIG. 2, such overlapping is not necessary for the creation of the combined seamless user interface. In one embodiment, the mobile devices have a projection system that is capable of panning and zooming Once mobile devices 102(a) and 102(b) are logically coupled, collaboration logic 126 of mobile device 102(a) can communicate with mobile device 102(b) to adjust a size or location of projection area 114(a) and/or projection area 114(b) to generate a seamless single display by combining the projection areas of all of the mobile devices. For example, mobile device 102(a) can act as a master device that controls projector 106(b) of mobile device 102(b) after the interconnection. Mobile device 102(b) in this example acts as a slave device that follows instructions from the master device 102(a) to adjust sizes or shapes of its projection areas 114(b). Once there is a space or overlapping between two or more projection areas, the master device 102(a) can detect it through its input sensor and control its own projector 106(a) and/or projector 106(b) of mobile device 102(b) to adjust the location of projection areas 114(a) and 114(b) to remove the space or the overlapping. If there are three or more projection areas to be combined, the master device can also authorize one or more other mobile devices to control certain projection areas that the master device cannot directly detect by its own sensing techniques such as a camera. In the case that the combined seamless user interface cannot be created due to a location of one mobile device being too far away from the other mobile devices, such mobile device can make signals or be controlled by the master device to make signals, such as warning sound, to remind the user to relocate it to be close to the other mobile devices to achieve the seamless single display.

After the interconnection among multiple mobile devices is established and the combined seamless user interface is created, users of the multiple mobile devices can use the combined seamless user interface to display content, such as a movie or a slide show, or enter into a group discussion mode to interact with each other on the combined seamless user interface.

In one embodiment, a mobile device can use the combined seamless interface to display content such as a movie, video, document, drawing, picture, or similar accessible resource. For example, in FIG. 2, because a projector of the mobile device (e.g., projector 106(a)) can only project a content such as a picture onto the remaining projection area (P4, C1, C2, C4, C3) of its own projection area 114(a), mobile device 102(a) can act as a master device to collaborate with the neighboring devices such as mobile device 102(b). In this situation, mobile device 102(a) transmits the content to the neighboring devices and controls them to project a portion of the content on their respective clipped or remaining projection areas. Collaboration logic 126 of mobile device 102(*a*) collaborates with the neighboring devices to ensure that a combination of portions of the content displayed at each remaining projection area presents a complete representation of the content.

In another embodiment, users of the multiple mobile devices can use combined seamless user interface to interact with each other and collaborate with each other. Several exemplary scenarios of such group collaboration are described in the following section.

Collaboration Examples

Figure 3:
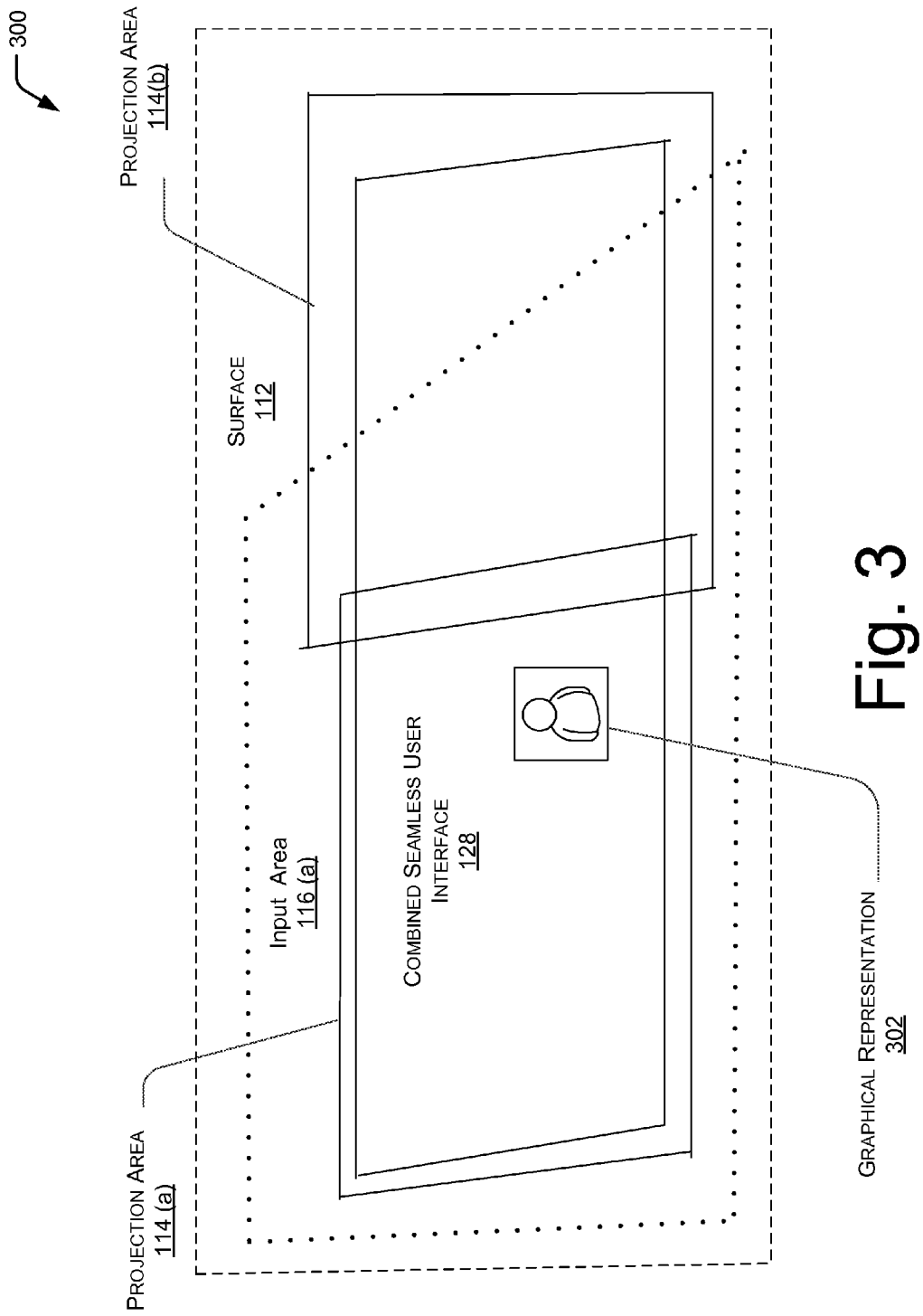
FIG. 3 is a block diagram showing an exemplary resource sharing scenario among multiple mobile devices based on the combined seamless user interface.

FIG. 3 shows one collaboration example using a combined user interface 128. In this example, the collaboration logic 126 visually represents computing device resources of the respective computing devices on their corresponding user interface areas. Files or other resources can be transferred between neighboring devices by dragging their visual representations to different areas of the combined user interface 128. The files or other resources can comprise documents, projects, pictures, videos, shortcuts, or any other resources that can be represented graphically on a user display.

In the example of FIG. 3, a graphical representation 302 represents a resource, such as an object containing contact information for a person. The graphical representation is shown as initially being in projection area 114(*a*), or a home area corresponding to mobile device 102(*a*). The user of the mobile device 102(*a*) can move graphical representation 302 from the projection area 114(*a*), considered the home area in this example, to the neighboring projection area 114(*c*) by "dragging" it with a finger or stylus. When graphical representation 302 crosses from projection area 114(*a*) to projection area 114(*b*), collaboration logic within the two devices 102(*a*) and 102(*b*) causes the resource represented by graphical representation 302 to be moved or copied from mobile device 102(*a*) to neighboring device 102(*b*).

The physical screen 104(*a*) of mobile device 102(*a*) can be used in conjunction with this technique. For example, private resources can be displayed on physical screen 104(*a*). When a user desires to share a resource, the resource can be dragged or moved onto combined user interface 128, where it becomes visible and accessible to other users.

Figure 4:
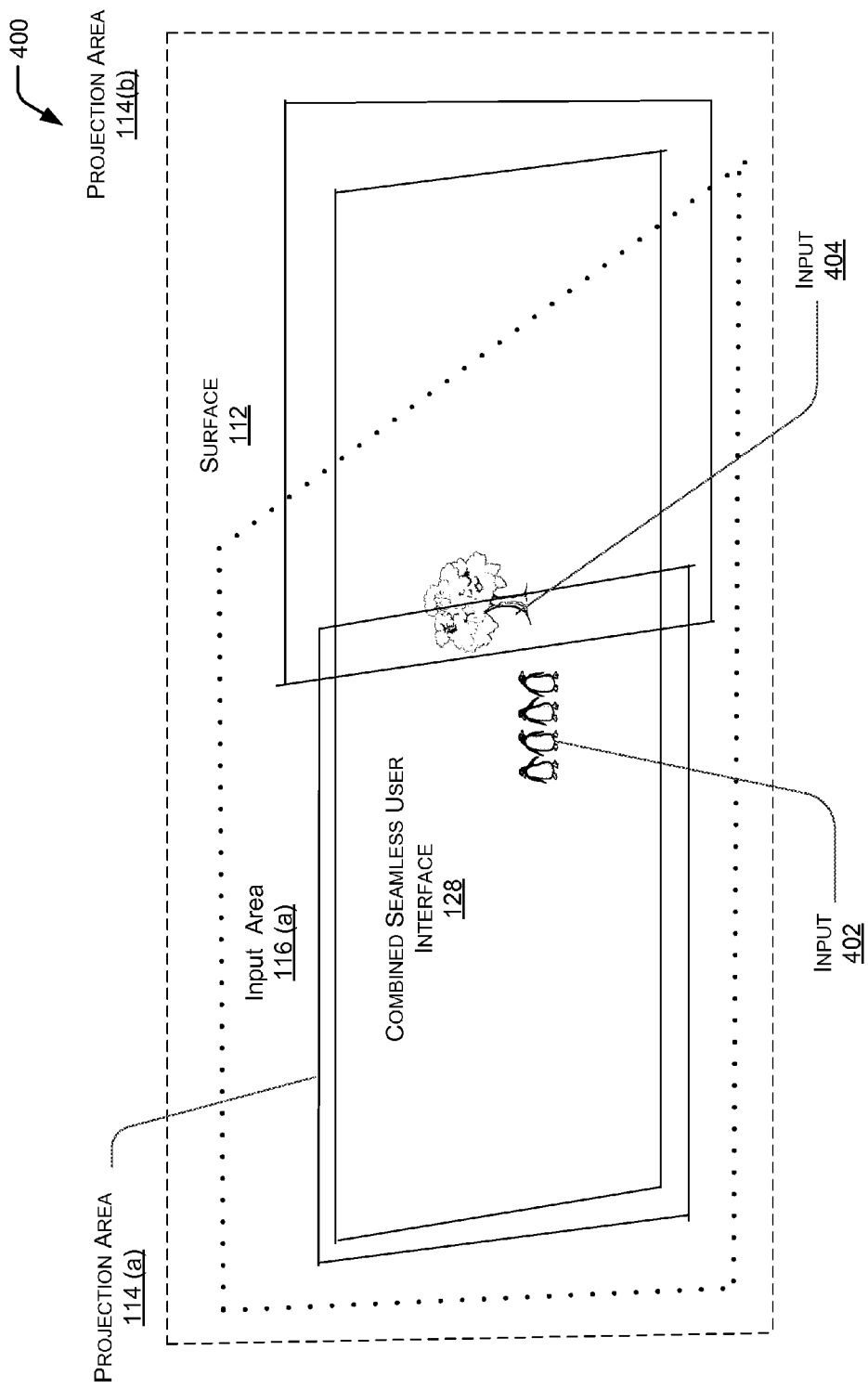
FIG. 4 is a block diagram showing an exemplary cooperating work scenario among multiple mobile devices based on the combined seamless user interface.

FIG. 4 illustrates another collaboration example in which users of devices 102(*a*) and 102(*b*) enter into a discussion mode to do some cooperating work. For instance, the users can finish a painting together.

In this example, a drawing canvas is presented on combined user interface 128 and one or more users can interact with the user interface to add features to the drawing canvas. Each user can directly paint on the combined seamless user interface. In the illustrated example, users have added features 402 and 404. Features can span projection areas 114(*a*) and 114(*b*), as illustrated by feature 404. Features or objects can also be moved between projection areas that form the combined user interface. In one embodiment, any changes to the canvas are saved in all devices that are participating in the collaboration.

Similarly, a common canvas or textual input area can be used to record events of a meeting. In this example, one mobile device is selected or designated by users to keep meeting notes of the multiple users' inputs on the combined seamless user interface. In addition to the final inputs on the combined seamless user interface, the meeting notes can also track a history of the inputs by users, which may or may not be removed from the combined seamless user interface during the discussion, and information of which user adds a particular input at a particular time, etc.

Any user can also add some-to-do list and even a next meeting's time and location on the combined seamless user interface to be included in the meeting notes. When the meeting is over, the meeting notes are saved on all or selected ones of the devices participating in the meeting or collaboration. Alternatively, the meeting record can be saved by one device and automatically emailed to the others.

A user can exit a group collaboration simply by removing their mobile device so that its projection area is separate from the combined seamless user interface. This device then drops out of the shared collaboration and projection sharing. Alternatively, a user can exit by explicit command, or by a dedicated button on the mobile device.

Optical Neighbor Recognition

Figure 5:
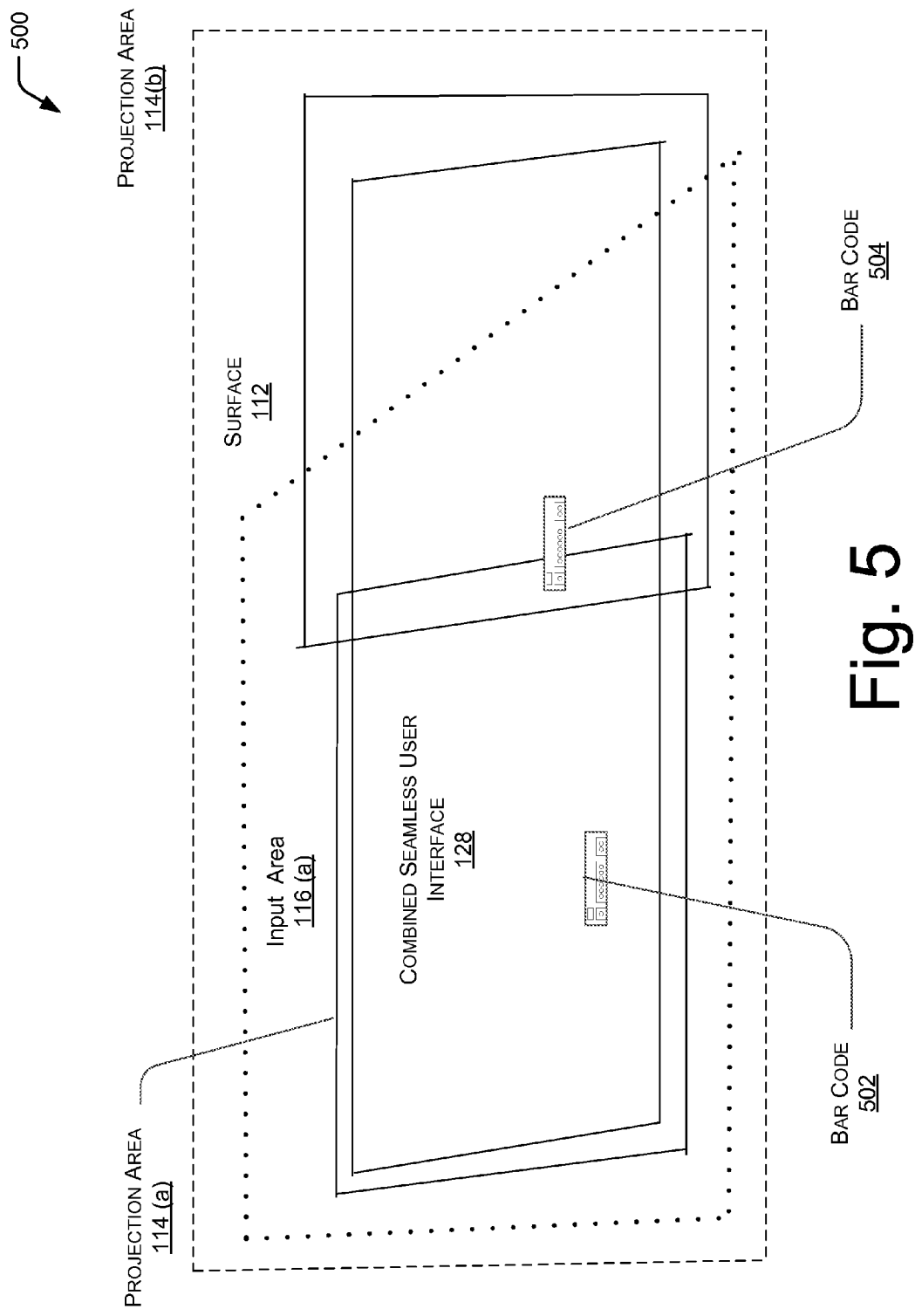
FIG. 5 is a block diagram showing an exemplary automatic identification of neighboring devices for purposes of coupling.

FIG. 5 illustrates how neighboring devices might automatically recognize each other for purposes of automatic coupling. In this example, after mobile device 102(*a*) has determined or detected the presence of a neighboring device by optically sensing one or more overlapping projection areas, it uses its camera to inspect the projection area of the neighboring device. During this inspection, it searches for any identifying information that might be projected by the neighboring device. When attempting to connect to an adjacent device, each device projects its own identifying information within its projection area. The information can be in a machine-readable format such as a barcode, examples of which are shown in FIG. 5 as barcode 502 and barcode 504. The identifying information can include whatever parameters might be needed for connecting to the device. Specifically, the information can include a device address, an authentication code, a user's name, and/or other information.

After the multiple mobile devices are interconnected, the multiple mobile devices collaborate to generate a combined seamless user interface.

Exemplary Procedural Details

Figure 6:
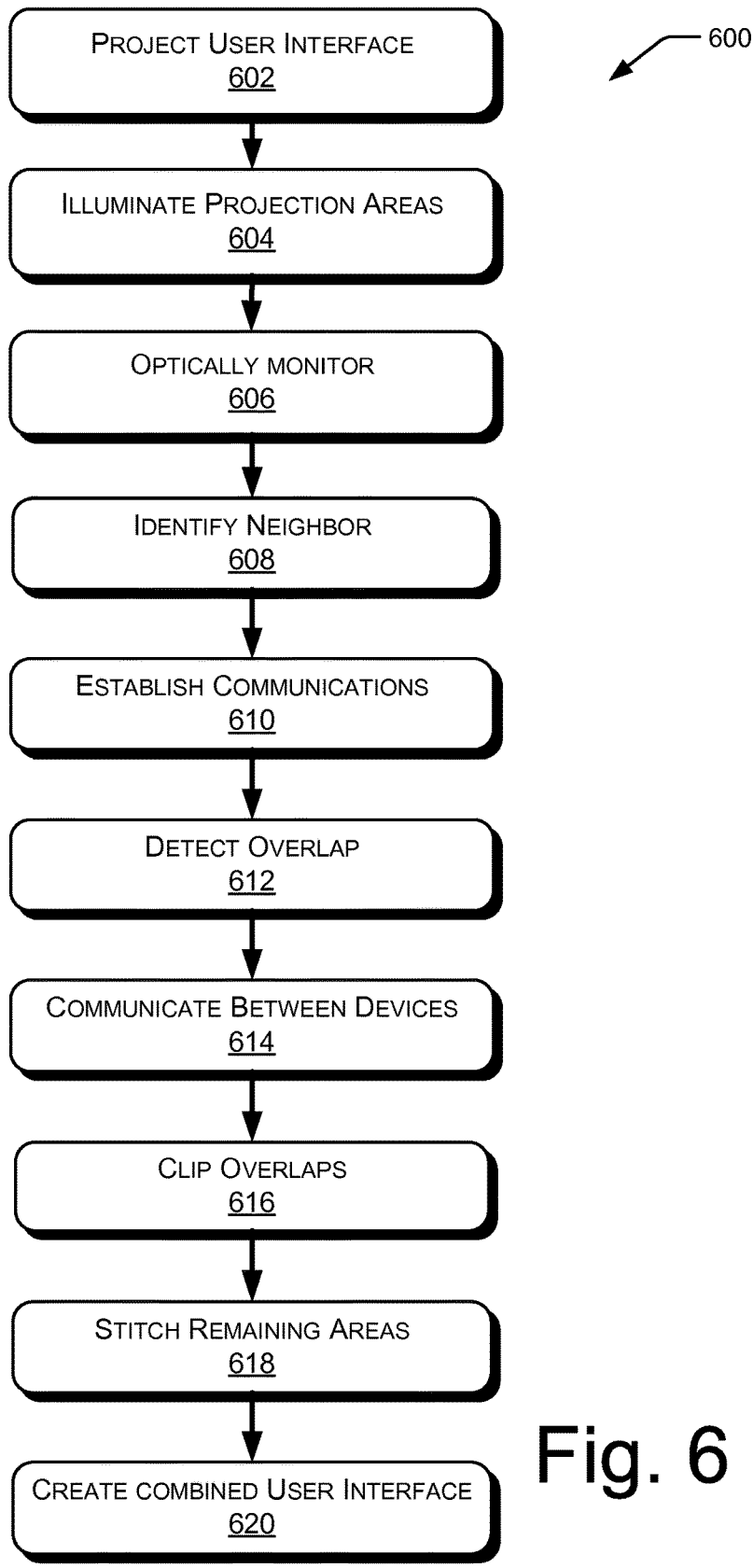
FIG. 6 is a flowchart showing an exemplary procedure of stitching overlapping projection areas of multiple mobile devices.

FIG. 6 shows an exemplary procedure 600 of collaborating between first and second mobile computing devices. Procedure 600 is described in the context of the physical environment of FIG. 1, in which first and second computing devices 102(*a*) and 102(*b*) have user interfaces that are projected in respective projection areas 116(*a*) and 116(*b*) on a common projection surface 112. The procedure is described as being performed by first mobile device 102(*a*), although in many embodiments it will be performed concurrently by both device 102(*a*) and device 102(*b*), and possibly by one or more additional devices having similar capabilities.

An action 602 comprises projecting a user interface or image in projection area 116(*a*) on surface 112. An action 604 comprises illuminating projection area 116(*a*) with infrared light, using illuminator 108(*a*) that is fixed within computing device 102(*a*). An action 606 comprises optically monitoring projection area 116(*a*), or monitoring camera 110(*a*) and detecting overlapping parts of projection area 116(*a*), and to detect user interactions within projection area 116(*a*).

An action 608 comprises detecting or identifying a neighboring projection device. As discussed above, this can be accomplished automatically or by requesting user input. In some embodiments, this comprises capturing identifying information (such as a barcode) projected by neighboring device 102(*b*). An action 610 comprises establishing communications with neighboring device 102(b) and communicating with neighboring device 102(b) based on the captured identifying information.

An action 612 comprises detecting an overlapping portion of the projection area 116(a) of first computing device 102(a) that overlaps with the projection area 116(b) of second mobile device 102(b). This can be done by sensing or evaluating brightness of the infrared illumination or of the projected user interface within projection area 116(a) of computing device 102(a). In the embodiment described herein, it is performed by detecting overlapping areas of infrared illumination.

An action 614 comprises communicating with second mobile device 102(b) and with other neighboring devices to coordinate clipping and stitching of their respective projection areas. This action involves communicating and negotiating various coordinates that define overlaps, cross points, and the clipping areas of each projection area.

An action 616 comprises clipping at least part of the detected overlapping portion from the projection area 114(a) of the first mobile computing device 102(a) to leave a remaining projection area.

An action 618 comprises graphically stitching the remaining projection area of the first mobile device with remaining projection areas of neighboring devices, such as device 102(b). An action 620 comprises coordinating with the neighboring devices to create seamless user interface 128 that includes at least portions of the projection areas 116(a) and 116(b) of first and second computing devices 102(a) and 102(b) and any other neighboring devices.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A mobile device comprising:
a processor;
a first projector that projects a first projection area on a surface external to the mobile device;
an illuminator that illuminates an input area with light, the input area including the first projection area and at least a portion of a second projection area projected by a second projector of another mobile device onto the surface, the surface being external to the other mobile device, the illuminator separate from the first projector such that the illuminator generates the light from the mobile device independent of the first projector, the mobile device being distinct from the other mobile device;
an imaging device that monitors the illumination of the input area to detect an interaction within the first projection area and the portion of the second projection area;
a physical screen; and
collaborative logic executable by the processor to coordinate the first projection area with respect to the physical screen and to control transfer of a resource from the mobile device to the other mobile device in a communication with the other mobile device, wherein the transfer is conducted in response to a graphical representation of the resource displayed on the physical screen of the mobile device being dragged by a user input across the physical screen of the mobile device such that projection of the graphical representation of the resource in the first projection area on the surface moves into the at least the portion of the second projection area on the surface to be detectable by the other mobile device, and in response to detection, by the other mobile device, of the movement of the projection of the graphical representation on the surface from the first projection area into the at least the portion of the second projection area on the surface to receive data associated with the resource, the graphical representation of the resource being different from the resource.

2. A mobile device as recited in claim 1, wherein the collaborative logic executed by the processor creates a combined seamless user interface, the combined seamless user interface including at least a portion of the first projection area and the portion of the second projection area.

3. A mobile device as recited in claim 2, wherein the combined seamless user interface allows graphical representations to span the portion of the first projection area and the portion of the second projection area.

4. A mobile device as recited in claim 2, wherein the combined seamless user interface allows graphical representations to move seamlessly between the portion of the first projection area and the portion of the second projection area based at least in part on the interaction.

5. A mobile device as recited in claim 1, further comprising:
a communication system; and
the collaborative logic executed by the processor arranged to interact with the another mobile device through the communication system to graphically stitch the first projection area with the second projection area.

6. A mobile device as recited in claim 5, wherein:
the imaging device further detects a portion of the first projection area that overlaps the second projection area, and
to graphically stitch the first projection area with the second projection area, the collaborative logic executed by the processor clips the portion of the first projection area and stitches a remaining portion of the first projection area with the second projection area.

7. A mobile device as recited in claim 1, wherein the imaging device further captures, from the portion of the second projection area, identifying information associated with the second mobile device.

8. A mobile device as recited in claim 7, further comprising a communication system that communicates with the second mobile device at least partly in response to capturing the identifying information.

9. A mobile device as recited in claim 1, wherein the light includes non-visible light.

10. A method for collaborating between a first mobile device and a second mobile device, the method comprising:
projecting, by a first projector of the first mobile device, a first projection area and a user interface on a surface external to the first mobile device, the user interface including at least a portion of the first projection area and at least a portion of a second projection area projected onto the surface by a second projector of the second mobile device, the surface external to the second mobile device, the first mobile device being distinct from the second other mobile device;
detecting, by an imaging device of the first mobile device, an interaction with the user interface, the interaction including a movement of an object from the portion of the second projection area on the surface to the portion of the first projection area on the surface, the object being a projection, by the second mobile device, on the surface of a graphical representation of a resource displayed on a physical screen of the second mobile device dragged by a user input across the physical screen of the second mobile device such that the projection of the graphical representation of the resource in the second projection area on the surface moves into the at least the portion of the first projection area on the surface; and receiving, by the first mobile device in a communication system of the first mobile device and based at least in part on the detected movement of the object on the surface, data associated with the object directly from a communication system of the second mobile device, the communication system being different from the imaging device and the data being different from the object.

11. A method as recited in claim 10, wherein:
the object includes a visual representation of a file; and
receiving the data from the second mobile device includes receiving the file from the second mobile device.

12. A method as recited in claim 11, wherein the file includes at least one of a document, a project, a picture, a video, or a shortcut.

13. A method as recited in claim 10, further comprising illuminating with light, by an illuminator of the first mobile device, an input area that includes at least a portion of the user interface.

14. A method as recited in claim 10, further comprising:
clipping, by the first mobile device, a portion of the first projection area that overlaps with the second projection area; and
stitching, by the first mobile device, a remaining portion of the first projection area with the second projection area.

15. A method as recited in claim 14, further comprising creating, based at least in part on the stitching, the user interface.

16. A mobile device comprising:
a processor;
a first projector that projects a first projection area on a surface external to the mobile device;
an imaging device that captures identifying information of a resource from the identifying information being projected in a second projection area by a second projector of another mobile device, the second projection area being on the surface external to the other mobile device, and the second projector being distinct from the first projector, the mobile device being distinct from the other mobile device;
a communication system that communicates with the other mobile device at least partly in response to capturing the identifying information of the resource;
a physical screen; and
collaborative logic executed by the processor to communicate with the other mobile device through the communication system, the collaborative logic executable by the processor to control transfer of the resource with the captured identifying information from the mobile device to the other mobile device in a communication with the other mobile device, wherein the transfer is conducted in response to a graphical representation of the resource displayed on the physical screen of the mobile device being dragged by a user input across the physical screen of the mobile device such that projection of the graphical representation of the resource in the first projection area moves into the second projection area, on the surface, generated by the second projector of the other mobile device to be detectable by the other mobile device, and in response to detection, by the other mobile device, of the movement of the projection of the graphical representation on the surface from the first projection area into the second projection area on the surface to receive the resource with the captured identifying information, the graphical representation of the resource being different from the resource.

17. A mobile device as claim 16 recites, wherein the identifying information includes at least one of a device address, an authentication code, or a user name associated with the other mobile device.

18. A mobile device as claim 16 recites, wherein the collaborative logic executed by the processor is arranged to communicate with the other mobile device through the communication system in order to generate a combined seamless user interface with the other mobile device.

19. A mobile device as claim 18 recites, further comprising a projector that projects a projection area for the mobile device, and wherein the combined seamless user interface includes at least a portion of the projection area projected by the mobile device and at least a portion of the projection area projected by the other mobile device.

20. A device as claim 18 recites, wherein the imaging device is further configured to capture an interaction within the combined seamless user interface.

* * * * *